United States Patent [19]
Tackney

[11] Patent Number: 5,833,387
[45] Date of Patent: Nov. 10, 1998

[54] DIRECTIONAL GROIN

[76] Inventor: David T. Tackney, 14733 Pine Glen Cir., Lutz, Fla. 33549

[21] Appl. No.: 590,770

[22] Filed: Jan. 24, 1996

[51] Int. Cl.$^6$ ...................................................... E02B 3/04
[52] U.S. Cl. .................................. 405/28; 405/21; 405/34
[58] Field of Search .................................. 405/21, 34, 35, 405/28, 15, 16, 29–32

[56] References Cited

U.S. PATENT DOCUMENTS

| | | | |
|---|---|---|---|
| 604,810 | 5/1898 | Waddell | 405/28 |
| 762,727 | 6/1904 | Landenberger | 405/35 |
| 3,011,316 | 12/1961 | Wilson | 405/28 |
| 3,214,916 | 11/1965 | Martin | 405/26 |
| 3,894,397 | 7/1975 | Fair . | |
| 4,221,500 | 9/1980 | Garrett . | |
| 4,367,978 | 1/1983 | Schaaf et al. | 405/30 |
| 4,374,629 | 2/1983 | Garrett . | |
| 4,437,786 | 3/1984 | Morrisroe . | |
| 4,439,058 | 3/1984 | Le Mehaute . | |
| 4,478,533 | 10/1984 | Garrett . | |
| 4,490,071 | 12/1984 | Morrisroe . | |
| 4,585,031 | 4/1986 | Raftis et al. . | |
| 4,607,663 | 8/1986 | Raftis et al. . | |
| 4,647,249 | 3/1987 | Grooms . | |
| 4,662,783 | 5/1987 | Muramatsu et al. . | |
| 4,711,598 | 12/1987 | Schaaf et al. . | |
| 4,804,294 | 2/1989 | Barthel . | |
| 4,896,996 | 1/1990 | Mouton et al. . | |
| 4,954,013 | 9/1990 | Lamberton . | |
| 5,336,018 | 8/1994 | Maudel . | |
| 5,388,928 | 2/1995 | Kumagi . | |
| 5,405,217 | 4/1995 | Dias et al. . | |

*Primary Examiner*—Dennis L. Taylor
*Attorney, Agent, or Firm*—David Kiewit

[57] ABSTRACT

Apparatus and method are provided for regulating shoreline change in cases where the magnitude of the longshore transport rate varies along a shoreline and is subject to periodic reversals. The method operates by selectively restricting the longshore sediment transport in one of the two possible shore-parallel directions. Some versions of the directional groin operate by changing the effective height of a low profile structure, while in others segments of the structure are selectively opened or restricted to sediment transport. The transport-obstructing portions of the groin may be positioned by flowing water, or may be moved by an electromechanical actuator acting under control of a microprocessor-based control system that also measures the direction of water flow.

6 Claims, 6 Drawing Sheets

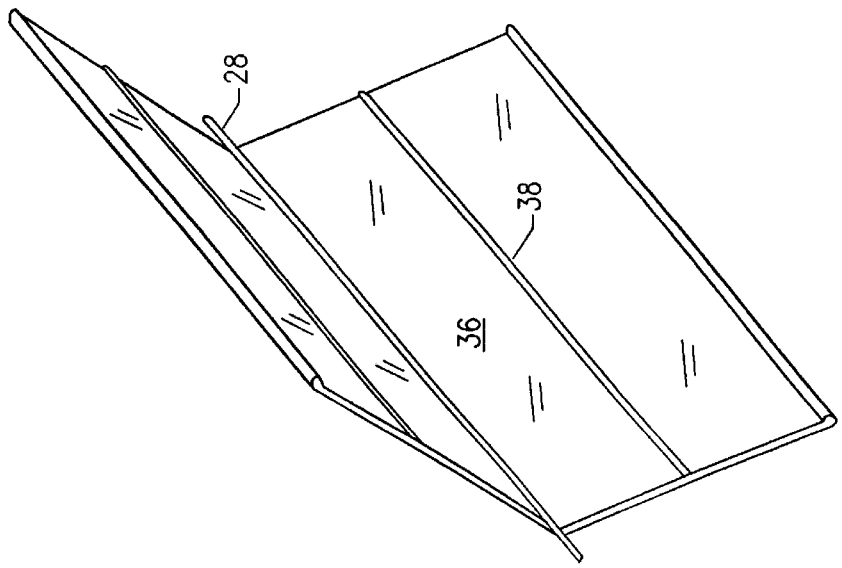
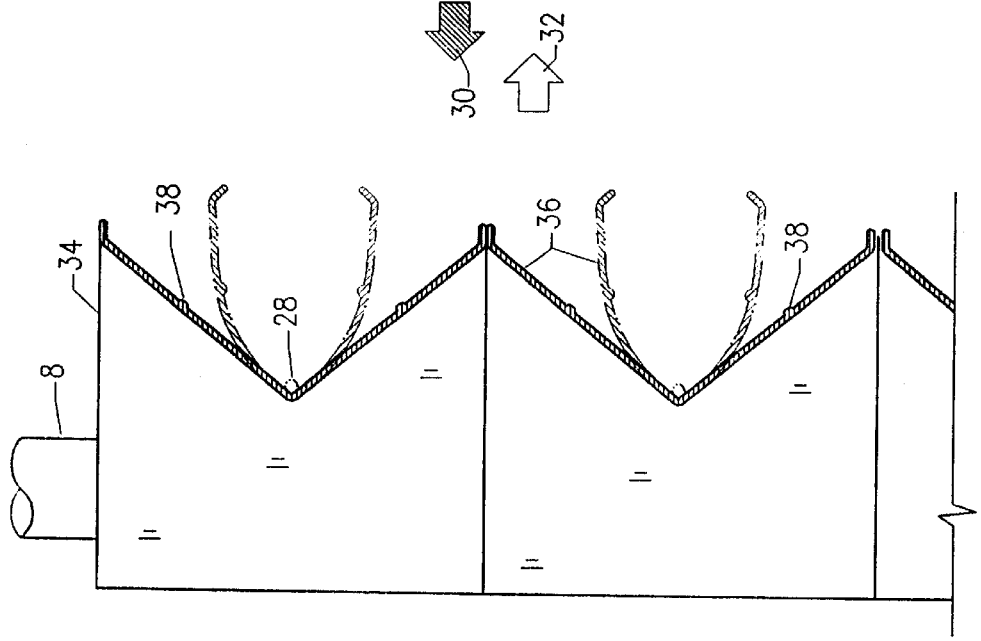
FIG.-5
FIG.-4

DIRECTIONAL GROIN

BACKGROUND OF THE INVENTION

1. Field of the invention

This invention relates to erosion control method and apparatus offering asymmetrical resistance to the longshore movement of water and sediment.

2. Description of Prior Art

This invention provides means of regulating shoreline changes caused by spatial variations in the rate of longshore sediment transport.

The sediment comprising a shoreline is seldom stationary. Waves striking the shoreline at an oblique angle produce longshore, or shore-parallel, movement of sediment. The wave forces can be considered as consisting of two perpendicular components which are referred to as the normal and longshore components. The normal component is that portion of the wave's force perpendicular to the shoreline, while the longshore component is parallel to the shoreline. Most of the energy of the normal component is expended through turbulent dissipation during the wave breaking process. A much smaller fraction of the longshore component, however, is dissipated and the remaining energy produces a longshore current parallel to the shoreline. Sediment, put in motion by the wave breaking process, is transported by this longshore current and this movement is referred to as longshore transport.

The longshore transport rate, as used herein, refers to the volume of sediment carried in a shore parallel direction for a specified period of time and has the dimensions of volume per unit time. In most locations wave activity is seasonal, so the most common period of time used for transport calculation is a year. Studies of longshore transport indicate that the magnitude of the transport rate is a function primarily of the wave height at breaking and of the angle between the wave crests and the shore line at breaking. Increases in either the wave height at breaking or of the wave angle result in higher transport rates.

Sediment motion can generally be characterized by three modes of transport: bed load; saltation; and suspended load. Bed load refers to the rolling or sliding motion of sediment in contact with the underwater soil surface. Saltation refers to the bounding or hopping motion of sediment that is temporarily suspended in the water columns but does not stay in suspension. Suspended load refers to sediment maintained in the water column through turbulence. For most littoral environments, the sediment load is not uniformly distributed through the vertical water column and most sediment transport occurs in the lower portion of the water column.

Sediment motion produced by wave activity can also be resolved into normal (i.e., onshore / offshore) and longshore components. Although significant shoreline recession can be produced by offshore movement of sand during storm conditions, little of this sand is removed from the active beach system and, during a subsequent recovery process, most of that sand is returned to the beach face. As a result, permanent erosion losses resulting from the offshore movement of sediment during storm conditions are usually quite small. Permanent erosion losses due to variations in the longshore movement of sediment, however, can be dramatic. It is this type of erosion loss that the invention addresses.

Along most sections of exposed shoreline, longshore transport of sediment can be considered to be one-dimensional. Continuity considerations for one-dimensional transport dictate that if the transport rate increases in the direction of transport, the adjacent shoreline erodes. Conversely, if the transport rate decreases in the direction of transport, the adjacent shoreline accretes. Shoreline stability is preserved only if the longshore transport rate is uniform when averaged over a period of interest.

Due to changes in shore alignment, irregular nearshore bathymetry and littoral barriers, longshore transport rates are seldom uniform over large sections of shoreline. Areas of change in the shoreline, which comprises both erosion and accretion, result from such non-uniformities.

Groins represent one of the oldest types of structures used to prevent shoreline erosion caused by the longshore transport of sediments. Such structures consist of partial or complete littoral barriers constructed along a line perpendicular to, or at an oblique angle to the shoreline and commonly extending both landward and seaward of the surf zone. Although usually constructed of stone or concrete, groins have been built of timber, steel and various combinations of materials. Aside from the choice of construction material, groin design parameters include length, height, alignment and permeability. In addition, groins have been designed to be adjustable so that their heights and lengths can be periodically changed. Descriptions and examples of various groin types can be found in the Shore Protection Manual published by the Coastal Engineering Research Center, Department of the Army.

Conventional groins function by creating a physical barrier to longshore sediment transport. Since the annual transport rates in the two possible longshore directions are seldom balanced, groins initially cause accretion on their updrift side (i.e., the direction from which predominant transport occurs) and erosion on their downdrift side (i.e., the direction toward which predominant transport occurs). This erosion and accretion pattern continues until the storage capacity of the groin is reached, at which point sediment begins to bypass the groin. Sediment bypassing usually occurs around the offshore end of the groin in relatively deep water.

The obstruction to a longshore transport rate afforded by a specific groin design depends not only on the groin dimensions, but also on wave climate and bathymetry at the site of installation. If wave conditions at a site produce a transport rate in one direction which strongly dominates the transport rate in the opposite direction, accretion and erosion changes will be greater than those occurring at a location where the transport rates are more nearly balanced. In a limiting case in which the transport rates in both directions are perfectly balanced, the long-term erosion and accretion rates will be negligible and shoreline changes will be restricted to the near vicinity of the structure. While conventional groins can be used to effectively stabilize the shoreline on the updrift side of the structure, they provide only a crude means of regulating the longshore transport rate and frequently result in accelerated erosion on their downdrift side.

For a given location, updrift accretion and downdrift erosion capacities of a groin generally increase as the length of the groin increases. The height of the structure also effects accretion and erosion. The crown elevations of most conventional groins are above the water line. These structures, therefore, provide a longshore transport-obstructing means over the entire height of the water column and, when bypassing occurs, it is directed around the offshore end of the structure. Two adverse consequences are generally associated with such tall structures. The longshore current may be redirected offshore along the updrift side of the structure so that bypassing, when it occurs, is restricted to relatively deep water. This latter feature generally results in increased shoreline recession immediately downdrift of the structure. Moreover, sand bypassing occurs only when the sand build-up on one side approaches the capacity of the structure. Because such build-up usually occurs only on the side from which the dominant transport occurs, the sediment moving in the opposite direction during periods of transport reversal is essentially prohibited from bypassing the groin.

Low profile groins constructed to have a more or less constant height above the littoral surface - i.e., that follow the beach profile —provide less of an obstruction to longshore currents. Once these groins have filled to capacity, they allow sand bypassing over the structure in the nearshore area. For a given length of groin, however, a low profile groin is a less effective littoral barrier because it restricts the sediment transport over only the lower portion of the water column.

Although numerous beach erosion control devices have been patented, almost all of the devices function by either reducing the wave energy reaching the shoreline or by regulating the movement of sediment in an onshore-offshore direction, rather than in a shore-parallel direction.

Examples of nearshore submerged breakwaters can be found in U.S. Pat. Nos. 4,954,013; 4,896,996; 4,804,294 and 4,711,598.

Examples of devices which modify the onshore-offshore movement of sediment can be found in U.S. Pat. Nos. 4,647,249; 4,954,013. Examples of artificial seaweed, intended to perform the same function, can be found in U.S. Pat. Nos. 4,490,071; 4,478,533; 4,437,786; 4,374,629 and 4,221,500.

In U.S. Pat. No. 3,894,397 Fair teaches asymmetrical flow-impeding apparatus for onshore-offshore erosion control. Fair's apparatus, of the type now known as a "sand grabber", comprises flap-like flow impeding elements disposed parallel to the shoreline, the flaps obstructing offshore flow through apertures in tubular members oriented with their axes in an onshore-offshore direction.

In U.S. Pat. No. 4,439,058, LeMehaute discloses an erosion barrier comprising an array of asymmetrical vertical vanes which promote the onshore movement of sediment. LeMehaute's vanes, which have a vee shape in horizontal section, flex in response to changes in the direction of water flow.

In U.S. Pat. No. 5,405,217 Dias discloses an erosion control device comprising a plurality of tubular units which may be utilized as a groin type structure. The device, however, affords the same obstruction to longshore transport in both possible shore parallel directions.

Examples of check values consisting of flexible structures can be found in U.S. Pat. Nos. 4,585,031, 4,607,663 and 5,336,018.

Kumagai, in U.S. Pat. No. 5,388,928, teaches an inflatable weir providing a variable height barrier to water flow in a river, the barrier constructed so as to minimize riverbed erosion on its downstream side. Another example of a flexible or inflatable barriers can be found in U.S. Pat. No. 4,662,783.

Waddell, in U.S. Pat. No. 604,810, teaches a jetty projecting outward from one bank of a tidal channel to approximately the middle of the channel, where the arrangements to used to deepen the channel. Waddell's jetty comprises hinged gated arranged so as to allow an incoming tide to pass with little obstruction. When the tide begins to fall, the outgoing waters close the gates automatically and thus greatly obstruct the flow on one side of the channel. Waddell teaches that this will produce a rapid outgoing current on the opposite side of the channel, which will carry with it much of the sand and silt, and thus rapidly deepen the channel. Waddell does not teach the construction of a jetty of groin projecting outward from an exposed shoreline. Waddell does not teach a method of regulating shoreline changes by retaining sediment along the side of the channel from which his jetty projects, but rather teaches a method of forcing currents away from that side of the channel.

SUMMARY OF THE INVENTION

The present invention provides a method of regulating shoreline change in cases where the magnitude of the longshore transport rate varies along a shoreline and is subject to periodic reversals, the method operating by selectively restricting the longshore sediment transport in one of two possible shore-parallel directions.

It is an object of the invention to provide a directional structure having a relatively high resistance to transport in one shore-parallel direction, and a lower resistance to transport in the opposite direction.

A preferred embodiment of the invention controls the degree of restriction of longshore sediment transport by adjusting the effective height of a low profile groin or by using program control to either lower the height of the structure or to open segments of the structure to through flow. The invention also provides a means of redistributing erosion losses along a shoreline and extending the useful life of artificial beach restoration projects by reducing end losses.

It is an object of the invention to provide directional groin means to reduce spatial non-uniformities in a net longshore transport rate by judiciously reducing one of the two constituent oppositely directed longshore transport rates. Because the net transport rate is the sum of two transport rates in opposite shore-parallel directions, variation in either of the constituent transport rates will alter the net transport rate. It should be noted that complete obstruction of the transport rate in one direction is neither necessary nor particularly desirable and that any significant reduction of transport in a restricted direction will reduce spatial non-uniformities in the longshore transport rate and thereby reduce shoreline changes.

A directional groin of the invention is applicable to shorelines having significant seasonal transport in both directions. In addition, because each directional groin has a finite area of influence, it is envisioned that a plurality of groins will be used in most cases.

It is a particular object of the invention to provide method and apparatus affording significant regulated restriction to longshore sediment transport in one direction and minimal restriction to transport in the opposite direction.

It is an object of the invention to provide method and apparatus for a passive and unattended control of longshore transport of sediment. In particular, it is an object of the invention to provide a groin extending offshore from the shoreline, the groin effecting significant resistance to longshore transport in one direction and little resistance to longshore transport in the opposite direction.

It is an additional object of the invention to provide method and apparatus actively controlling longshore transport of sediment by locally permitting or impeding sediment transport responsive to a measured direction of water flow.

It is a particular object of the invention to provide apparatus comprising a plurality of movable panels for the active control of longshore transport of sediment, the apparatus comprising actuator means moving a plurality of panels simultaneously, the actuator means functioning reliably even when some of the panels have been rendered immobile because of the accretion of sediment about them.

It is another object of the invention to control the degree of restriction of longshore transport with a directional groin that is alterable as needed by adding or removing flow control panels or by fixing selected panels in either an open or a closed position.

It is a further object of the invention to provide a variable height barrier, which may be rigid or inflatable, for regulating the longshore transport of sediment.

It is a still further object of the invention to provide a directional groin having a controllably alterable maximum storage capacity. Such changes in storage capacity can be provided by adding or removing flow control panels, by fixing panels in their open or closed positions, or by changing the heights of the barriers in a raised position.

DESCRIPTION OF THE DRAWING

FIG. 4 is a partially sectioned view of a movable panel of a second embodiment of the invention, the view taken in the same section as used for FIG. 2.

FIG. 5 of the drawing is a perspective view of the flexible panel of FIG. 4.

DESCRIPTION OF THE PREFERRED EMBODIMENT

Figure 1:
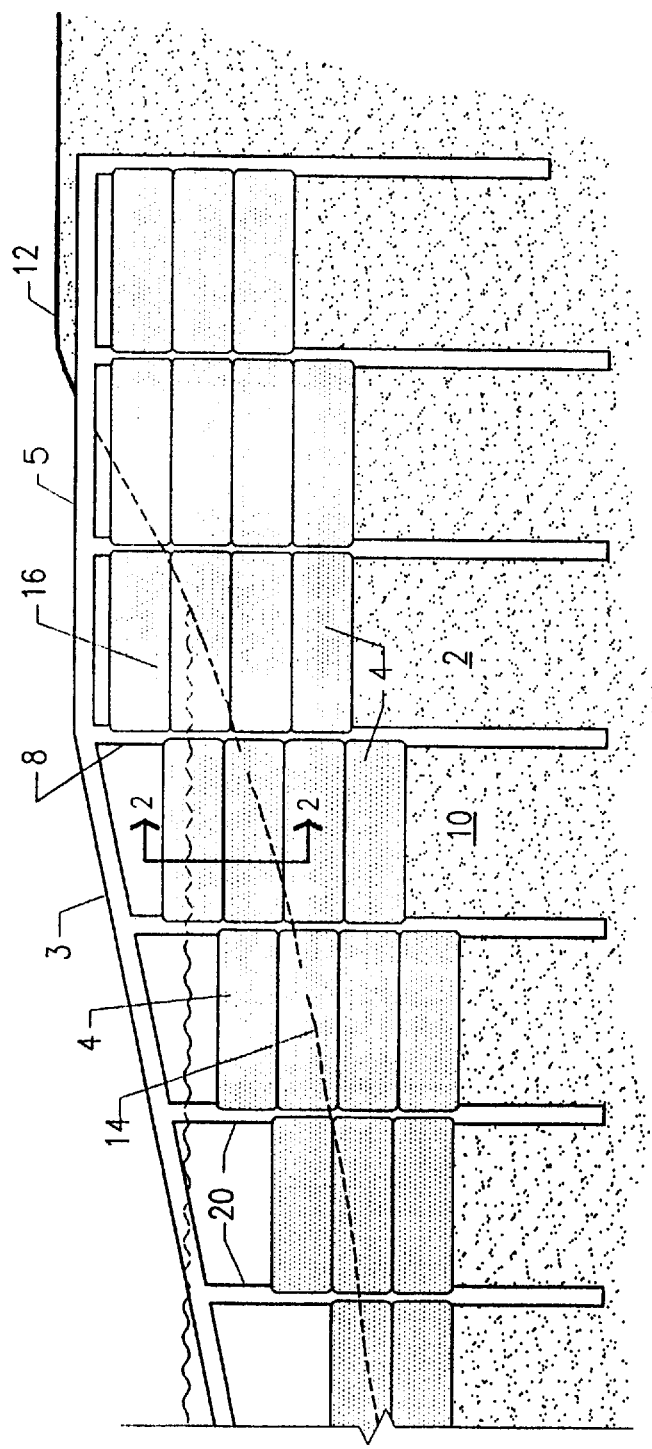
FIG. 1 is a side elevation view of a groin of the invention exposed by section through the earth and water in which it is constructed.

Turning initially to FIG. 1 of the drawing, one finds a partial sectional view of a groin 3 having a plurality of selectively movable members or panels 4, each movable member hingedly attached intermediate two adjacent support pilings 8. Aside from the movable panels 4 and associated hardware, the groin 3 is a conventional structure comprising a headrail 6 and a plurality of support pilings 8, each having one end embedded in the sand 10 or other material making up the beach 12 and littoral subsurface 14 adjacent the beach 12, the pilings 8 spaced apart along a line or curve, which commonly extends landward and seaward of the shoreline 16.

As described supra, the apparatus of the invention is applicable to cases where water currents in the unrestricted direction (indicated with a heavy solid arrow 32 in FIGS. 2, 3, 4 and 6) and in the restricted direction (which is indicated with an outlined arrow 30 in FIGS. 2, 3, 4 and 6) are oppositely directed. In these cases, the invention provides movable panels 4 closed to flow in the restricted direction 30 and open to flow in the unrestricted direction 32.

Figure 2:
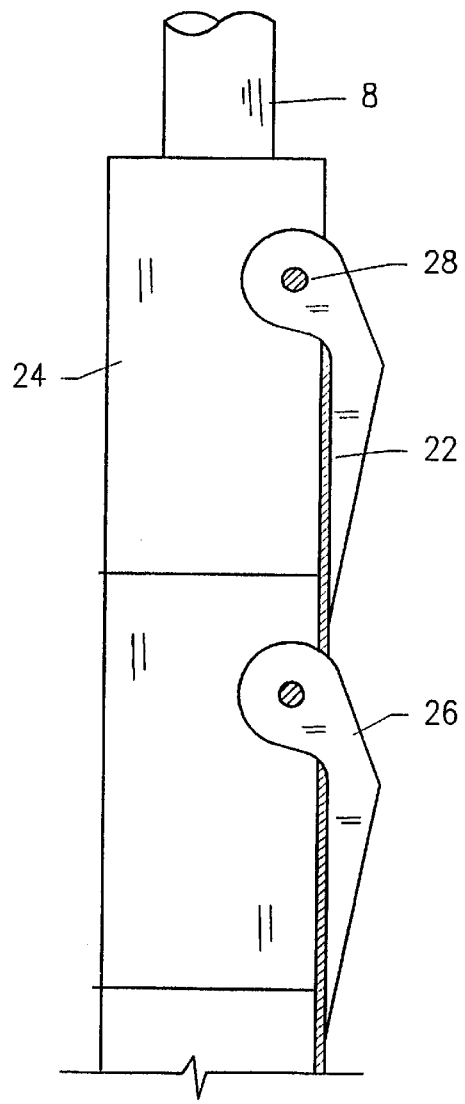
FIG. 2 shows a partially sectioned view, the view taken in the section indicated by arrows 2—2 FIG. 1.
Figure 3:
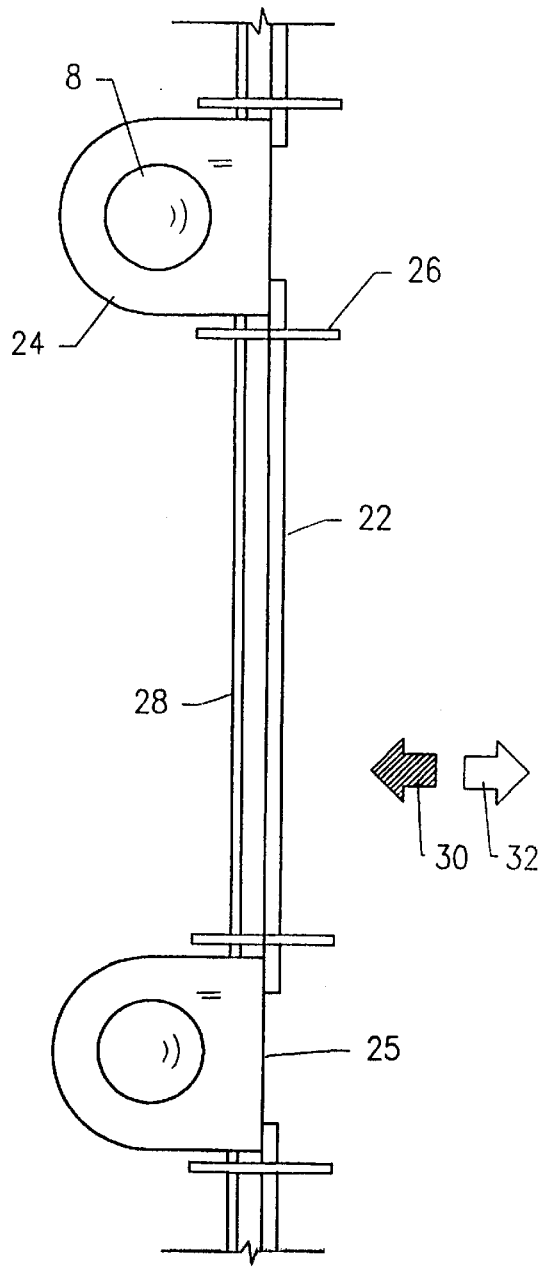
FIG. 3 shows a plan view of the movable panel of one embodiment of the invention.

Turning now to FIGS. 2 and 3 of the drawing, one finds a movable panel structure comprising a generally rigid swinging check panel 22 pivotally connected by suitable gusset support means 26 to a support rod 28 running between pilings 8 along the groin 3. The density and buoyancy of the panel 22 and gusset 26 are chosen so that, in the absence of a longshore current, the panel 22 will assume a vertical or closed position. Flow in the restricted direction 30 forces the panel against a seat surface 25 of the mounting collar 24 and thereby blocks transport of water and sediment in one longshore direction generally perpendicular to the groin. Flow in the opposite longshore direction 32 causes the panels to rotate into an open position, thereby allowing transport of water and sediment through the structure. It is understood that although the check panel 22 can have a range of lengths perpendicular to the support rod, the check panel 22 is expected to have a length less than the width between pilings 8 so that a deflected panel does not extend very far from the groin. Moreover, although the support rod 28 could be oriented in any arbitrarily chosen direction parallel to the groin, it preferably has a horizontal or near horizontal orientation so that the bottom edge of each panel 22 will be more or less parallel to the sand of the littoral surface 14. This configuration will reduce the likelihood of the panels being jammed in a partially open position by sand build-up. It may be additionally noted that the panels 22 may be nearly abutting (as shown in FIG. 2) or may have a non-planar shape to allow adjacent panels to overlap horizontally or vertically.

In a second embodiment, shown in FIGS. 4 and 5 of the drawing, a flexible panel or baffle 36 flexes about a support rod 28. When the longshore current is in the unrestricted direction 32, the baffle 36 deforms away from its cooperating seat member 34 (as shown by phantom lines in FIG. 4) so as to permit through flow. When the longshore current is in the restricted direction 30, the panel 36 seals against the seat member 34 and thereby impedes or prohibits flow. The vertically flexible baffles 36 may be fabricated using sheets of natural or synthetic elastomers. The baffles may be horizontally reinforced with internal stiffening members or external battens 38 to add horizontal stiffness to and allow the baffles 36 to cover larger inter-piling apertures (e.g., as indicated with reference character 20 in FIG. 1 of the drawing) than could be achieved with non-reinforced baffles.

The embodiments of the invention described supra represent applications of the art of check valves to provide a means of regulating longshore sediment transport. It will be recognized to those skilled in the art that other mechanisms drawn from the check valve art could provide the same function.

In the embodiments described supra the effective height and shape of the groin 3 are determined by the number of panels 4 installed between the pilings 8. Hence, panels 4 must be added or removed to adjust the effective vertical dimensions of the structure 3. In other embodiments of the invention, discussed hereinafter, the need to periodically add or remove panels 4 from a groin 3 is overcome by providing an active control system 40.

Figure 6:
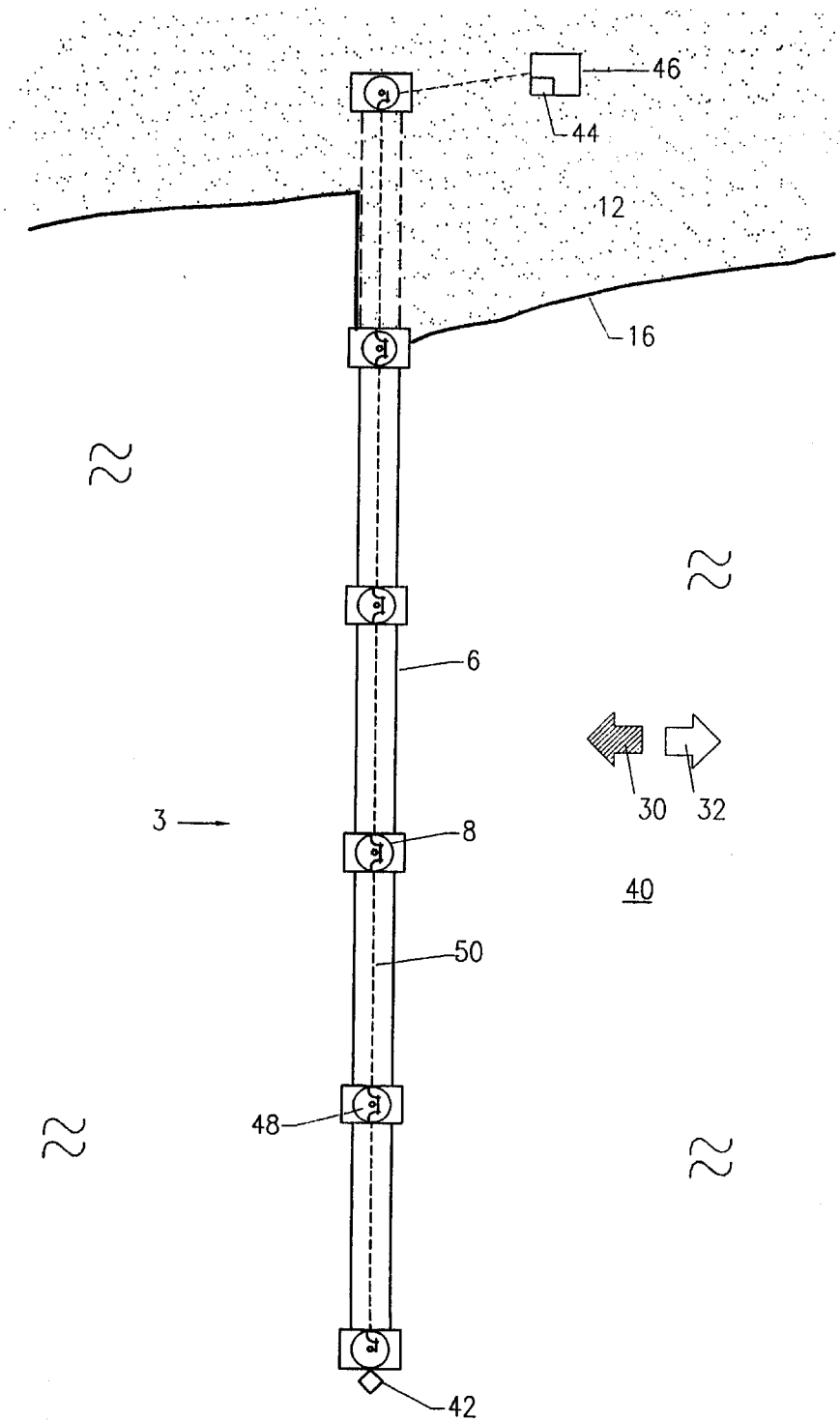
FIG. 6 is a schematic top plan view of a third groin of the invention.

FIG. 6 shows a plan view of an active control system 40 for a groin 3 extending offshore from a shoreline 16. The active control system 40 may comprise a sensing means 42 to measure the direction and/or magnitude of the longshore currents 30,32. The sensor 42 may be located at the groin 3 or may be remotely disposed, in which case it communicates with the controller 46 by known remote communication means (not shown). Signals from the current meter 42 are transmitted to the controller 46, which may preferably be a microprocessor operating under the control of a stored program or may be any of a number of other controllers known to the art. Commands from the controller 46 are transmitted to electro-mechanical actuators 48 which either open the actuable panels or gates 50 to permit flow in the unrestricted direction 32, or close the gates 50 to impede flow in the restricted direction 30. A control system 40 may also be configured without using a flow sensor 42. In such a case a timekeeping means 43, such as the digital clock commonly used in a microprocessor controller 46, can be used to open or close the gates 50 in a time sequential fashion.

Although many mechanisms are known in the art for selectively opening and closing apertures, the control system 40 of the invention preferably uses an actuator mechanism 48 capable of driving a plurality of gates 50 independently of whether all of those gates are free to move or some of them are jammed in one position by an external force. That is, the directional groin 3 should function when some of its nominally movable gates 50 are actually immobile because of being partially or entirely buried in the sand or other sediment 10. As noted supra, in order to effectively regulate longshore transport of sediment the asymmetrical groin 3 need comprise means offering greater or lesser degrees of flow restriction, and need not provide means that either totally eliminate flow or that provide no impediment to flow.

Figure 7:
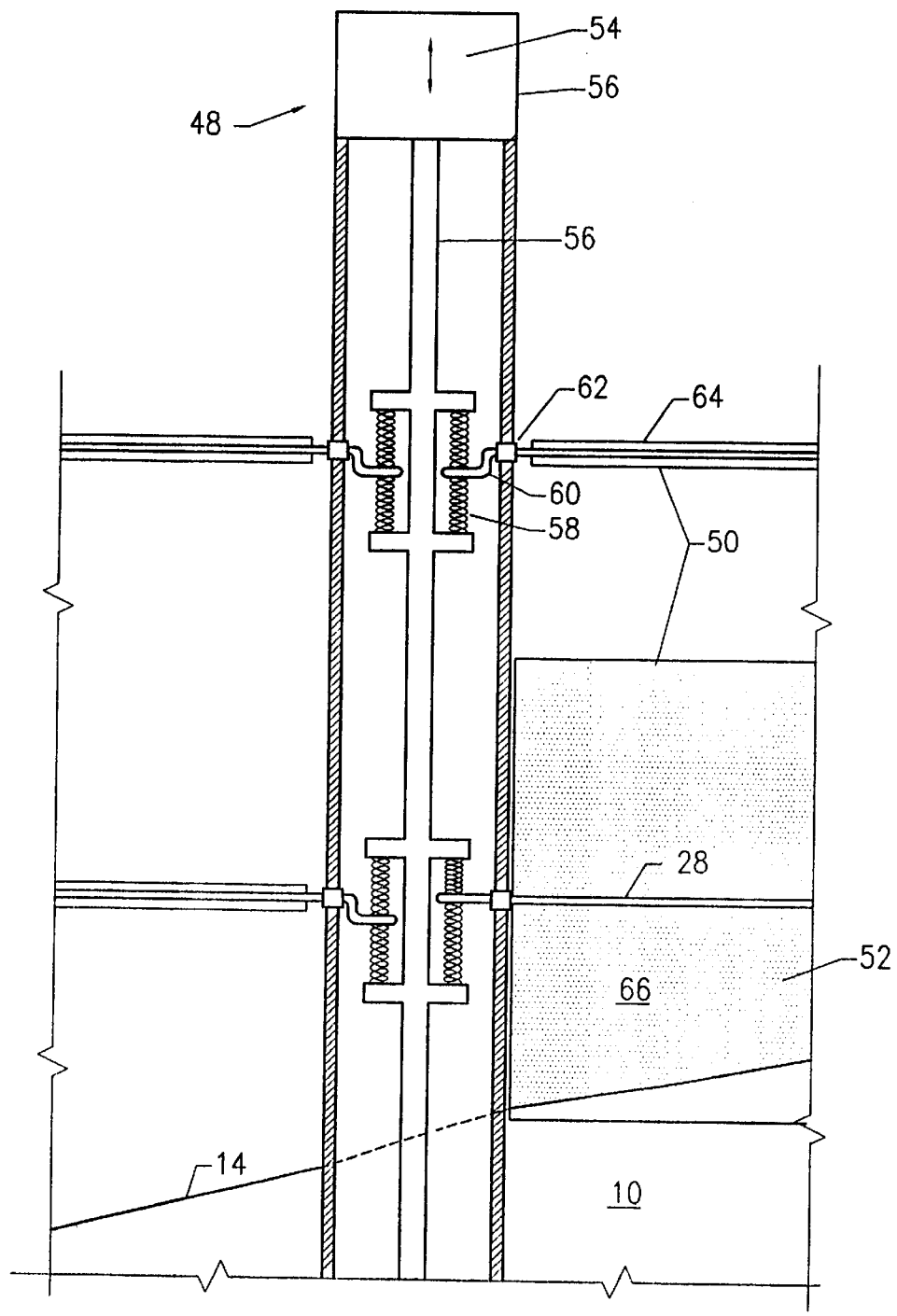
FIG. 7 is a schematic side view of the movable panels of FIG. 6 and of a portion of a control system.

A schematic example of one version of an actuator 48 compatible with a panel or gate 50 jammed in a vertical closed portion 66 is shown in FIG. 7. The actuator 48, which in this embodiment comprises a lifting and lowering mechanism 54, is linked by means of a vertical drive rod 56 and springs or other flexible coupling means 58 to a support rod 28 having a crank 60 configuration at one end. When the rod 56 is driven downward, as illustrated in FIG. 7, the flexible couplings 58 bear on the crankshaft 60 and oscillate the crankshaft 60 (which is mounted in suitable bearings or bushings 62) so as to turn the panel of the actuable gate 50 into its open, horizontal, setting as indicated by the numeral 64. Enough play is provided in the flexible connecting means 58 so that a jammed gate 50, nominally driven by the same drive rod 56, can remain in a closed setting (as indicated with reference numeral 66 in FIG. 7), an open setting 64, or an intermediate setting without preventing the actuator 48 from rotating the other controllable panels or gates 50. Moreover, if the jammed gate 50 subsequently becomes free as a result of flowing water removing the obstructing sand or other sediment 10, the flexible connection means 58 would bias the once-jammed gate 52 into the desired open horizontal setting 64. Alternately, when the longshore current is in the restricted direction, a signal from the sensing element would, through the action of the controller 46, lifting and lowering means 54, and vertical drive rods 56, produce torque on the horizontal vanes 50 to position them in the vertical or closed position 66.

Figures 8, 9:
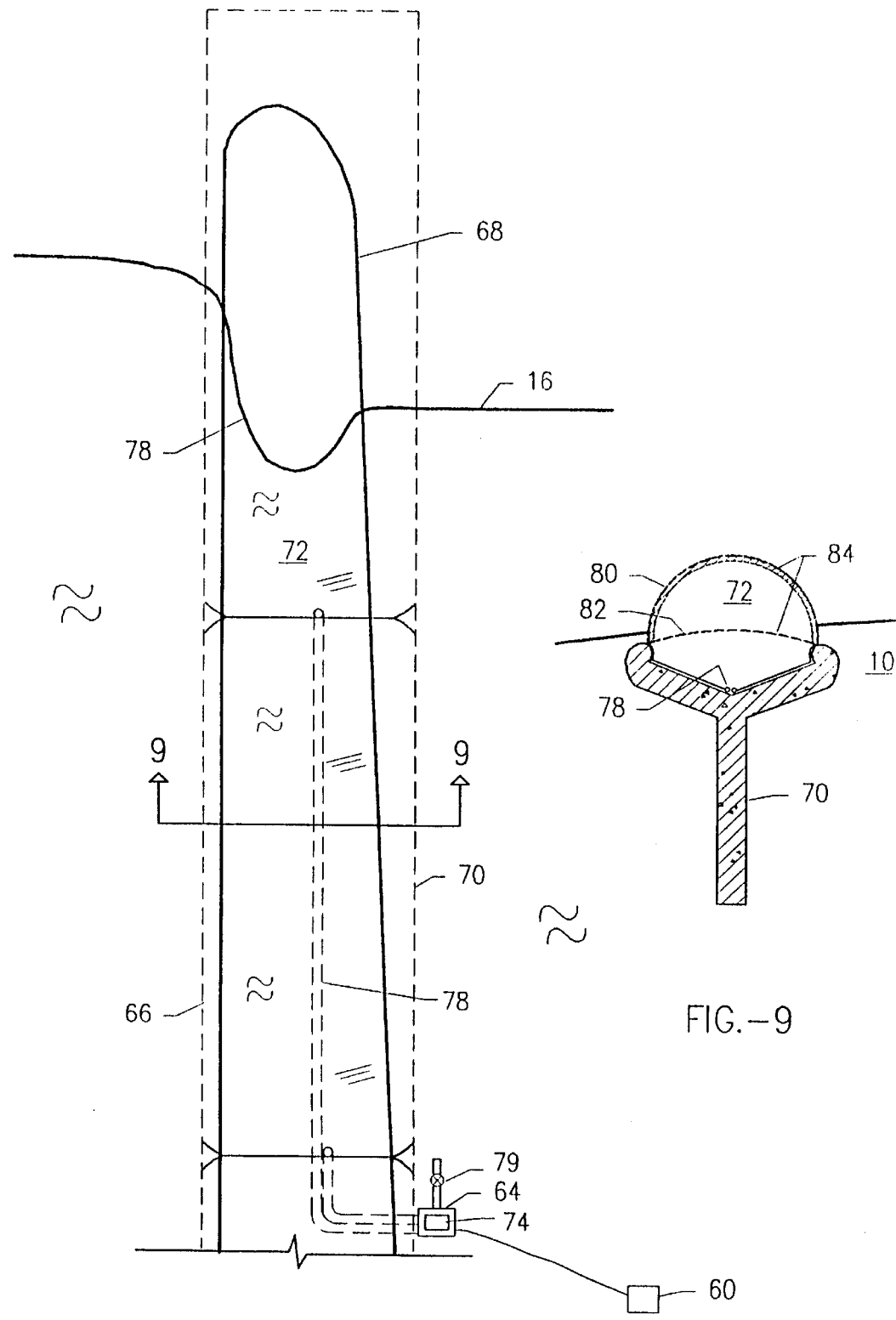
FIG. 8 is a top plan view of a fourth groin of the invention.
FIG. 9 is a partially sectioned view of the groin of FIG. 8, the view taken in the section indicated by arrows 9—9 in FIG. 8.

Yet another embodiment of a groin 3 is shown in FIGS. 8 and 9. Here, a plurality of longitudinal inflatable barrier members 72 are utilized to provide an obstruction of variable height to longshore transport of sediment. Each barrier 72 may be cradled in and secured to a rigid frame 70 fabricated of steel, concrete or other suitable material. Each frame 70 is embedded in and partially covered by sand 10 or other material making up the littoral subsurface 14. In FIG. 8 the sand line 68 shows the boundary between the buried and exposed portions of the barrier 72. Similarly, the water line 78 shows the boundary between the submerged and emergent portions of the barrier 72.

Inflation and deflation of the barrier 72 is regulated by an active control system 40 having optional sensing elements 42 as previously described. For the case of an inflatable barrier 72 the actuator 48 portion of the system 40 may comprise a submersible pump 74 discharging water through venting and filling pipes 76 into the barrier. Deflation of the barrier 72 is accomplished by utilizing a vent valve 79 operated by the controller 46 to partially relieve the pressure in the barrier 72. When the controller 46 receives a signal from the sensing means 42 that the longshore current is in the unrestricted direction 32, the barrier 72 is vented to relieve internal pressure (the collapsed barrier 72 is indicated in phantom with the reference character 82 in FIG. 9). When the longshore current reverses to the restricted direction 30, the barrier 72 is pressurized and inflated to a predetermined elevation as indicated with the reference numeral 80.

The inflatable barrier elements 72 may be fabricated from natural or synthetic elastomers. To add rigidity and strength to the barriers 72, reinforcing plies, similar to those used in automobile tires, may be employed. Moreover, portions of the inflatable members 72 may comprise pleats 84 or other expansile configurations to allow vertical expansion.

It will be appreciated that similar regulation of longshore sediment transport can be accomplished utilizing rigid adjustable barriers or barriers which have both rigid and flexible components.

Although the present invention has been described with respect to several preferred embodiments, many modifications and alterations can be made without departing from the invention. Accordingly, it is intended that all such modifications and alterations be considered as within the spirit and scope of the invention as defined in the attached claims.

I claim:

1. A method of regulating shoreline change of an exposed shoreline by restricting the longshore transport of waterborne sediment in a predetermined one of two possible shore parallel directions, the method comprising the steps of:
    a) constructing a groin oriented generally perpendicular to the exposed shoreline the groin extending offshore from the shore;
    b) attaching a moveable member to the groin, the moveable member moveable between a transport obstructing position wherein it obstructs the longshore transport of the sediment and a non-obstructing position;
    c) moving the moveable member into the transport obstructing position when water bearing the sediment flows in the predetermined direction; and
    d) moving the moveable member toward the non-obstructing position when the water bearing the sediment flows in the direction opposed to the predetermined direction.

2. The method of claim 1 wherein in step c the movable member is moved into the transport obstructing position by the flowing water.

3. The method of claim 1 wherein the movable member is moved into the transport obstructing position by actuator means.

4. The method of claim 1 wherein: the movable member comprises a variable height barrier; step c) is carried out by raising the barrier; and step d) is carried out by lowering the barrier.

5. The method of claim 1 wherein the groin comprises a plurality of spaced-apart pilings, the movable member comprises a rigid panel pivotally attached between two adjacent ones of the pilings, and wherein in step c) the flowing water forces the panel against a mounting collar.

6. The method of claim 1 wherein the movable member comprises a flexible panel that, in step c), is moved against a cooperating seat member by the flowing water and that, in step d), is moved away from the cooperating seat member by the flowing water.

* * * * *

UNITED STATES PATENT AND TRADEMARK OFFICE
CERTIFICATE OF CORRECTION

PATENT NO. : 5,833,387
DATED : November 10, 1998
INVENTOR(S) : David T. Tackney

It is certified that error appears in the above-identified patent and that said Letters Patent is hereby corrected as shown below:

Column 8, line 47, insert a comma after "shoreline".

Signed and Sealed this

Eighteenth Day of May, 1999

Attest:

Q. TODD DICKINSON

Attesting Officer

Acting Commissioner of Patents and Trademarks